United States Patent [19]

Crausbay

[11] 4,132,901

[45] Jan. 2, 1979

[54] ELECTRIC POWER GENERATING SYSTEM

[76] Inventor: Don Crausbay, P.O. Box 1279, St. Thomas, V.I. 00801

[21] Appl. No.: 602,794

[22] Filed: Aug. 7, 1975

[51] Int. Cl.² .......................................... F03B 13/12
[52] U.S. Cl. ...................................... 290/53; 417/330
[58] Field of Search .............................. 417/330-332, 417/495, 507; 290/43, 54, 42, 53

[56] References Cited

U.S. PATENT DOCUMENTS

| | | | |
|---|---|---|---|
| 1,796,618 | 3/1931 | Peterson | 417/330 |
| 2,820,148 | 11/1958 | Southwick | 290/42 |
| 4,036,563 | 7/1977 | Tornkuist | 290/53 |

Primary Examiner—Robert K. Schaefer
Assistant Examiner—John W. Redman
Attorney, Agent, or Firm—A. W. Breiner

[57] ABSTRACT

This relates to an electric power generating system particularly adapted for use in locals where there is an absence of a water supply with sufficient elevation to supply the required power for an electrical energy generating system, or the water supply is insufficient for the required generating system. The deficiency is overcome in part by providing an elevated water supply reservoir and a system of gravity actuated water powered pumps for utilizing the discharge of the generating system to pump at least a portion of the discharge to the elevated reservoir. It is further proposed to utilize a pumping system of the wave motor type for pumping relatively available water at sea level to the elevated water reservoir. It is also proposed to provide a split stream of water from an elevated water supply to two generators at different elevations with the discharge from the uppermost generator being recombined with the other portion of the split stream for introduction into the generator at the lower level.

10 Claims, 12 Drawing Figures

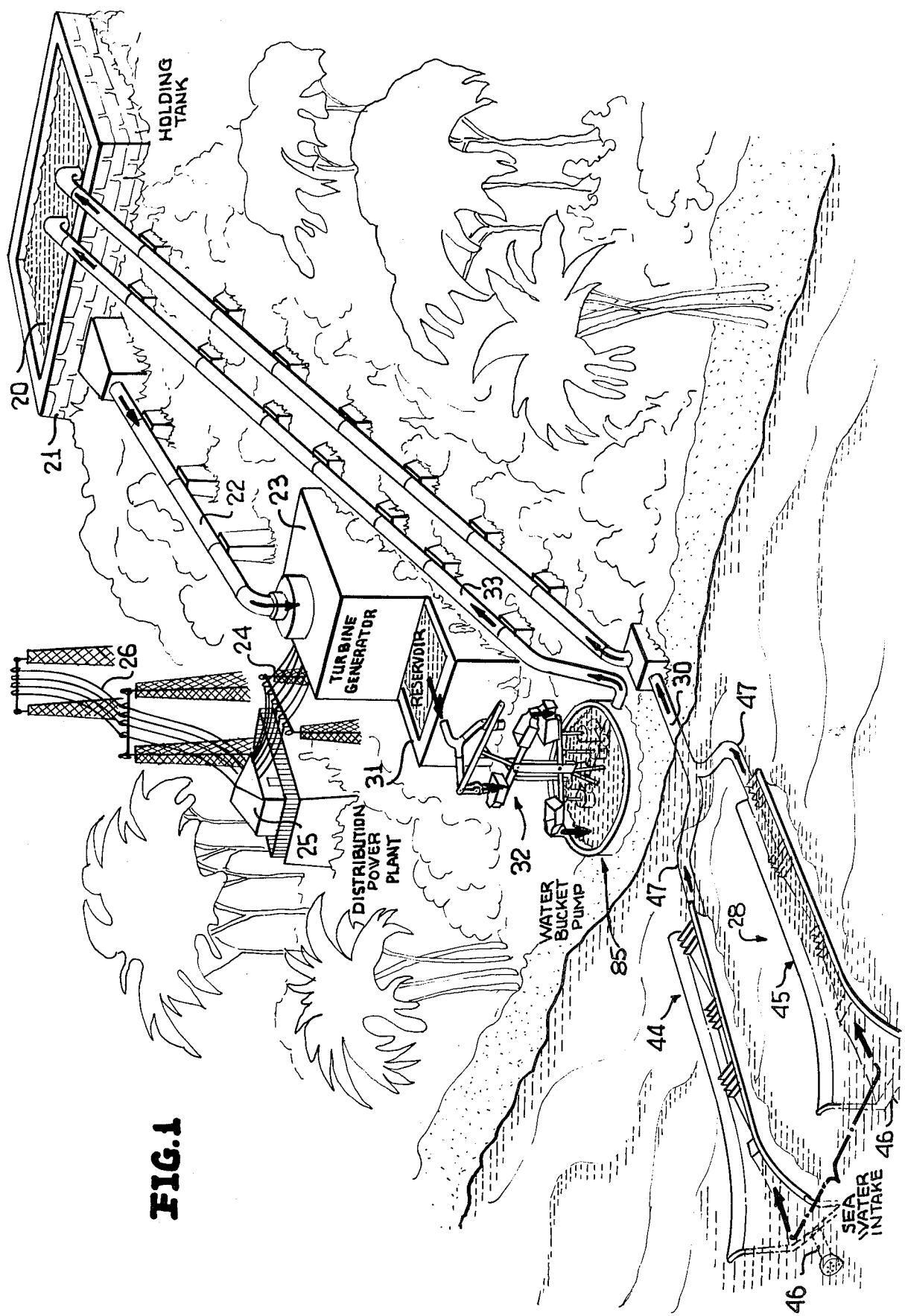

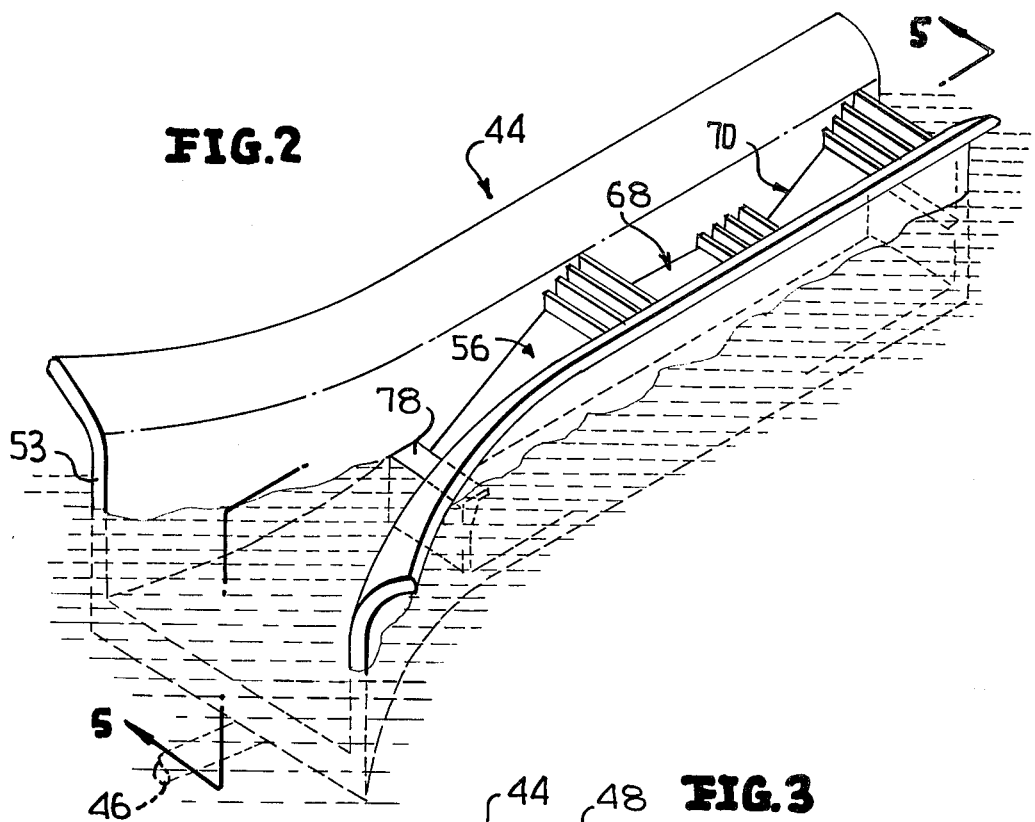
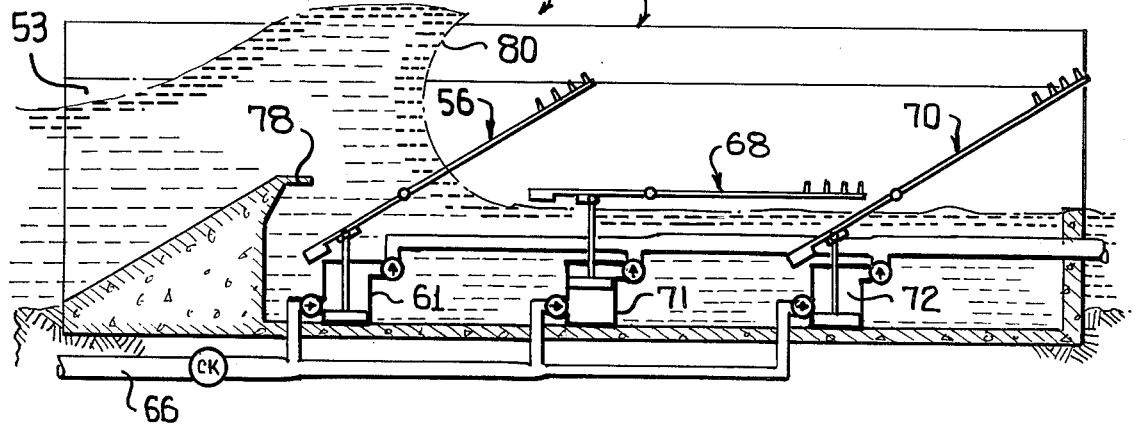
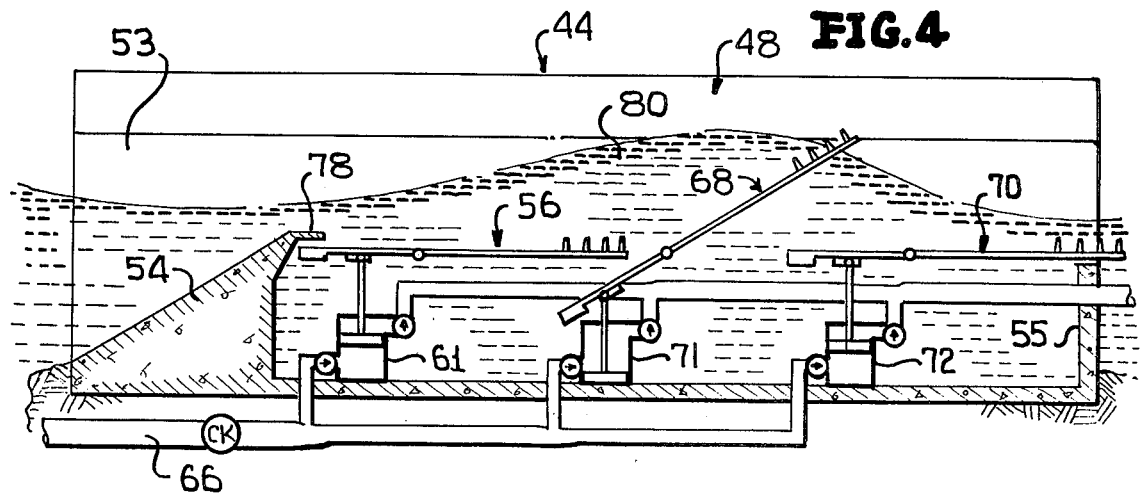

ELECTRIC POWER GENERATING SYSTEM

This invention relates in general to new and useful improvement in electrical generating systems, and more particularly to an electrical generating system which may be utilized in areas which do not have a sufficient supply of water at the necessary elevation to operate the required generators.

In certain locals, particularly on many islands, there is no elevated water supply which could be utilized for the purpose of generating electricity. However, along the shores of such an island is an abundant supply of water at sea level, together with an abundant power supply in the form of waves. In accordance with this invention, it is proposed to provide an elevated reservoir for water and to utilize efficient wave actuated pumps for pumping sea water up to the reservoir and then utilize the water from the reservoir to operate electrical generators.

It is also proposed to provide a second pumping system so as to utilize the remaining energy of the water discharged from the generators to pump at least a portion of the discharge from the generators back up to the water reservoir.

It is also proposed to obtain a maximum efficiency with the limited supply of water available by splitting the supply stream into two streams with one of the two streams being directed to a first generator at a first level and then combining the discharge from the first generator into the second stream and thereafter directing the combined flow of the two streams to a second generator at a lower level.

While the proposed system is primarily intended to be utilized in conjunction with a wave power source, it is to be understood that the invention is not so limited in that the pumping system may be utilized in conjunction with a stream of limited capacity utilizing the limited power of the stream for the purpose of pumping a portion of the water of the stream to the elevated reservoir either before or after the introduction of water from the stream to an electrical generator.

It is further proposed to provide a novel wave motor pumping system wherein there is a plurality of baffles with the baffles being actuated primarily by the weight of the water of each wave thereon and the baffles being interconnected whereby adjacent baffles move one another to upright positions for effectively receiving the force of the wave.

Another feature of the wave motor pumping system is the mounting of baffles within a trough in a manner wherein the flow of wave water thereover is controlled and wherein there is no backward flow of wave water which will act to a disadvantage on the baffles.

It is further proposed that the gravitational water powered pumping system be of the bucket and walking beam type wherein buckets at opposite ends of the walking beam are sequentially filled and discharged to effect the constant pivoting of the walking beam and thus produce motor power for pumps.

Further, it is proposed that there be more than one walking beam in each pumping system so that the water discharged from an upper set of buckets will be discharged into a lower set of buckets and thus obtain a maximum efficiency with a minimum of water.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a perspective view illustrating an electrical power generating system constructed in accordance with this invention.

FIG. 2 is an enlarged perspective view showing the details of a wave motor type pumping system.

FIG. 3 is a schematic longitudinal sectional view taken through the wave motor powered pumping system of FIG. 2 and shows generally the arrangement thereof and the actuation of pumps by waves.

FIG. 4 is a view similar to FIG. 3 and showing a further sequence of the actuation of pumps.

Figure 7:
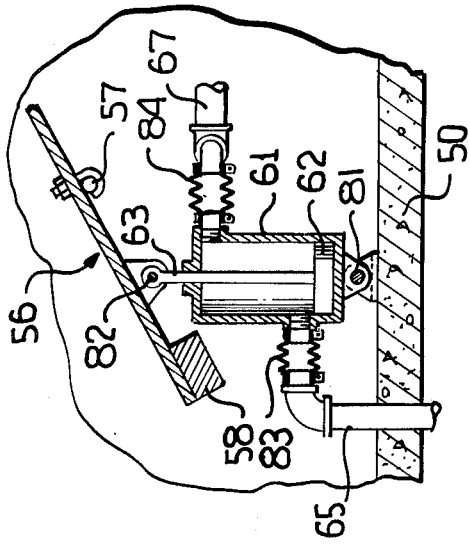
FIG. 7 is a fragmentary sectional view showing a modified connection between a baffle and a pump.
Figure 6:
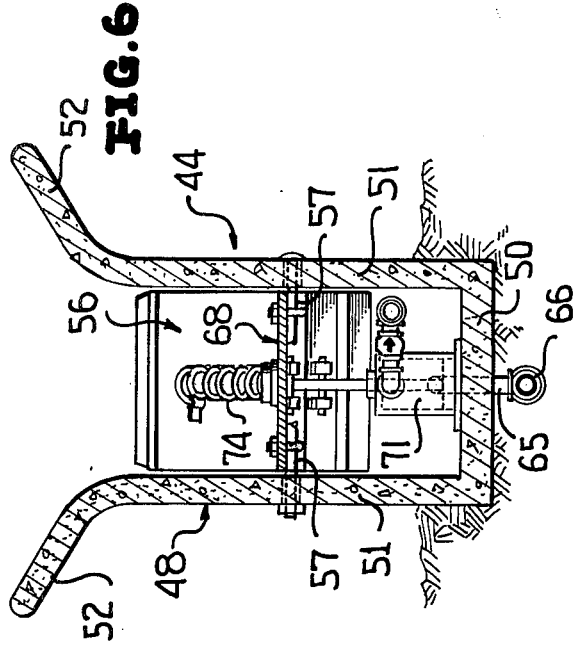
FIG. 6 is a transverse sectional view taken along the line 6—6 and shows further the details of the system.

The basic principles of the electric power generating system will be primarily described with respect to an area wherein there is insufficient flowing water in the form of a stream or river for the generation of electric power, such as on an island. Referring now to FIG. 1, it will be seen that such a system includes an elevated source of water 20 which is retained in an elevated holding tank or reservoir 21. The water 20 is directed downhill, as required, through a supply pipe 22 to a conventional water powered electric generator 23, preferably of the turbine type. The generated electricity is delivered by a transmission system 24 in a conventional manner to a distribution plant 25 from which it is transmitted in a conventional manner by a transmission system 26 to the ultimate users.

Inasmuch as there is no flowing stream or river for supplying the water 20 to the holding tank 21, it is obvious that the water must be pumped thereinto. In accordance with this invention, the electric power generating system includes a wave power pumping system, generally designated by the numeral 28. The pumping system 28 directs water into a piping system 30 for delivery to the holding tank 21. The details of the pumping system 28 will be described hereinafter. However, it is to be appreciated that in accordance with the broad aspects of this invention, any type of wave powered pumping system may be utilized and that it is well known that there is sufficient energy in the waves to provide an effective pumping of water to an elevated holding tank, such as the holding tank 21.

It will also be apparent that the generator 23 in most instances will be located at an elevated site and therefore, the water discharged therefrom will have a certain amount of energy retained therein of a gravitational nature. Accordingly, it is proposed to provide a reservoir 31 for collecting the discharge of the generator 23 and to utilize the gravitational power of the water within the reservoir 31 to drive a bucket type pumping system, generally identified by the numeral 32, for returning at least a portion of the discharge from the generator 23 to the holding tank 21. The pumping system 32 directs water into a pipe 33 which discharges into the holding tank 21. It is to be understood that the gravity actuated pumping system 32 may be of any type although a preferred arrangement has been provided and the same will be described in more detail hereinafter.

At this time it is also pointed out that while it is much simpler to pump the sea water up into the holding tank 20, where sea water is objectionable because of the corrosive action thereof as far as the generator 23 is concerned, it is feasible to utilize fresh water, if the same should be available wherein that water discharged from the generator 23 not pumped by the pumping system 32 will be pumped by the pumping system 28. However, such an arrangement will require a larger than normal reservoir 31.

Reference will now be made as to how a stream or river having insufficient power for the normal actuation of an electric generator may be utilized in conjunction with a generation system of FIG. 1. First of all, if there should be a water supply at an elevation above the holding tank 21, this water supply could be directed into the holding tank and thus utilized. On the other hand, if the water supply is below the level of the holding tank, it may be directed into a pumping system, such as the pumping system 32 for directing a portion of the water thereof into a holding tank, such as the holding tank 21. Another alternative is available in the situation wherein the power of the stream is not sufficient to supply the necessary energy for the required electric power. In such an arrangement the stream may be directed into a generator of a capacity matching the stream, and thereafter downstream of the generator, the stream may be directed into a pumping system, such as the pumping system 32 where the stream is utilized to pump a portion thereof up to a holding tank, such as the holding tank 21 for direction to a second generator. The discharge from the second generator may be utilized to operate a further pumping system, such as the pumping system 32 for returning a portion of that water through the holding tank.

Figure 12:
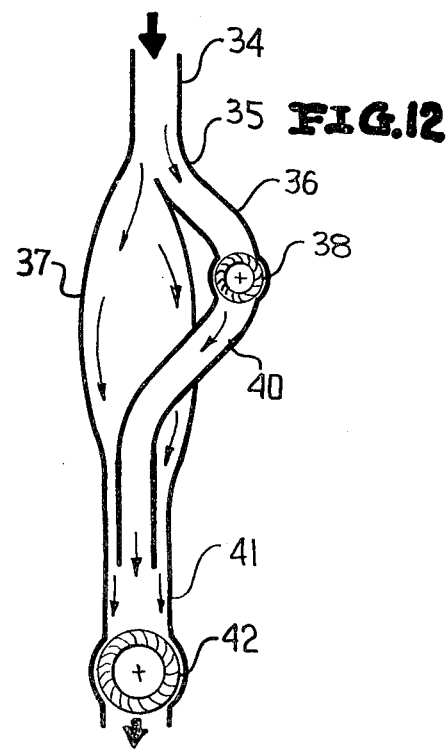
FIG. 12 is a schematic showing of an arrangement for obtaining a maximum utilization of water flowing under pressure in the generation of electrical energy.

Reference is now made to FIG. 12 wherein there is illustrated a system for obtaining maximum efficiency of electric power generation with a limited amount of water flowing under pressure in a conduit. The water is supplied by a conduit 34 which is provided with a splitter arrangement 35 for splitting the flow into two stream, one stream flowing into a conduit 36 and the other stream flowing into a conduit 37. The flow in the conduit 36 is directed to an electric power generator 38 for driving the same.

The conduit 37 is increased in cross section and has extending into the interior thereof a conduit 40 which receives the discharge from the generator 38. The conduit 40 extends generally into the center of the conduit 37, which has a reduced diameter lower portion 41. The flow from the conduit 40, that is the discharge from the generator 38, is combined with the second stream of flow from the original conduit 34 in the lower portion 41 of the conduit 37 and thus intermingles with the second stream or flow and is in part impelled thereby. The combined flow in the conduit portion 41 is then directed into a second generator 42 at a lower level than the generator 38. The generator 42 would have a greater generating capacity than the generator 38. A practical arrangement would be to divide the flow from the conduit 34 in half with the generator 38 having approximately one half the generating capacity of the generator 42.

It will be readily apparent that the generating system of FIG. 12 may be advantageously utilized in conjunction with a limited water supply system, such as that shown in FIG. 1.

Reference is now once again made to the pumping system 28. The pumping system 28 is preferably of a multiple unit construction so that one of the units may be shut down for maintenance as required while the other unit or units may continue to supply water to the holding tank 21. Normally, the pumping units will be identical and in the illustration of FIG. 1, the pumping system 28 includes pumping units 44 and 45 each having its own intake 46 and discharge 47 with the discharges 47 being preferably united and coupled to the pipe 30. Only the pumping unit 44 will be described in detail hereinafter.

Figure 5:
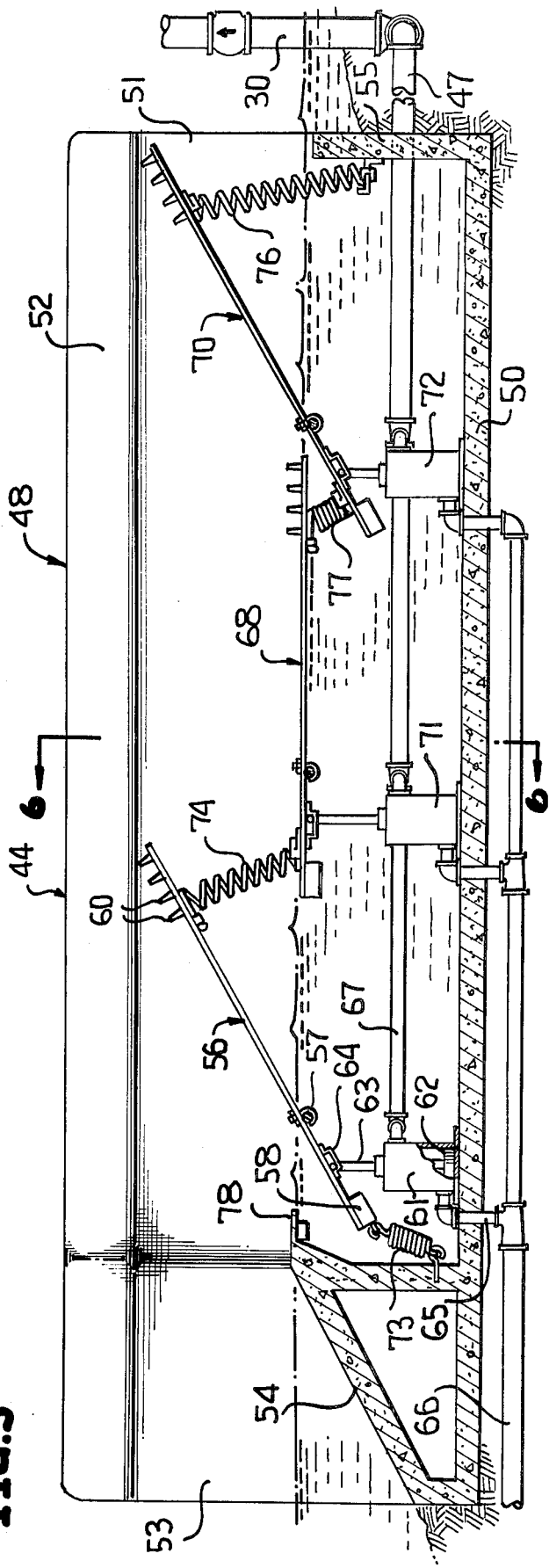
FIG. 5 is a fragmentary longitudinal sectional view taken along the line 5—5 of FIG. 2 and shows more specifically the details of the wave motor powered pumping system.

Reference is now made to FIGS. 2 through 7 wherein the general details of the pumping unit 44 are illustrated. As is best shown in FIGS. 2 and 5, the pumping unit 44 includes an enlongated trough, generally identified by the numeral 48 and including a bottom wall 50, upstanding side walls 51 and flared upper shoulders 52 for the concentration of waves within the trough 48. Further, as is clearly shown in FIG. 2, the trough 48 has a flared entrance 53 for effectively concentrating a maximum amount of water from waves within the trough 48.

Within the flared entrance 53 there is constructed a ramp 54 to assure the flow of water into the trough 48 at a preselected elevation. The lower part of the trough 48 is closed at its exit end by a transverse wall 55. It is to be understood that the top of the wall 55 will be generally at the normal water level and serves the purpose of preventing returned wave flow through the trough 48 which would detrimentally effect the efficiency of the pumping unit.

The pumping unit 44 includes a plurality of baffles which are pivotally mounted and are interconnected so as to cooperate with one another. It is to be understood that the number of baffles may vary and while only three baffles have been specifically illustrated in conjunction with the pumping unit 44, it is to be understood that there may be a much larger number of baffles with all intermediate baffles being connected to adjacent baffles in the same manner as the intermediate baffle to be described hereinafter.

The baffles of the pumping unit 48 include a forward baffle 56 which is mounted for pivotal movement about an axis extending transversely of the trough 48 and generally at the mean level of water about a pivot 57. The construction of the forward baffle 56 is typical of the other baffles of the pumping unit 44 with the pivot 57 being located forwardly of the longitudinal center of the baffle and the forward part of the baffle having secured to the underside thereof a counter weight 58 so that without the influence of water and other means, the baffle 56 would normally assume a horizontal position.

It is to be understood that the baffle 56, when horizontally disposed, would generally permit a wave to freely flow thereover. The baffle 56 is primarily intended to rely upon the weight of the water thereon and the over-center relationship of the mounting thereof to produce a force for actuating a pump in the manner to be described hereinafter. However, in order to also advantageously utilize the flowing motion of the wave, the rear portion of the baffle 56 is provided with upstanding transverse baffles 60 which may be of any desired efficient configuration.

Mounted in the trough 48, preferably on the bottom 50 thereof, below the forward portion of the baffle 56 is a first pump 61. The pump 61 is of a conventional type and is provided with a piston 62 connected to a lower end of a piston rod 63 which has the upper end thereof connected by means of a coupling 64 to the underside of the baffle 56 adjacent the pivot 57. It is to be understood that the pumping stroke of the pump 61 is on the upstroke thereof.

Water is supplied to the lower part of the pumps 61 through a pipe 65 which is coupled to a supply pipe 66 which, in turn, is coupled to the intake 46. Water is discharged from the upper part of the pump 61 under pressure into a pipe 67.

It is to be understood that the pump 61 will be provided with suitable check valves (not shown) of a conventional type so as to control the directional flow of water. Further, other check valves may be provided in the system, as may be deemed necessary.

As previously described, the pump unit 44 includes other baffles and more specifically in the illustrated form of FIG. 5, the pump unit 44 includes an intermediate baffle 68 and a rear baffle 70. The baffles 68 and 70 will be of a similar construction to the baffle 56 and will be mounted in a similar manner. The baffle 68 is associated with a pump 71 while the baffle 70 is associated with the pump 72. The pumps 71 and 72 are connected to the intake 46 by suitable piping and are also coupled to the pipe 30 by suitable piping.

It is to be understood that the baffles 56, 68 and 70 function in cooperation with one another in a special manner. The forward baffle 56 is normally urged to an upstanding position by a resilient member 73 which is illustrated as being of the tension type, but which could be of the compression type. The baffle 56 is further normally urged towards an uppermost position by a resilient member 74 extending between the rear portion thereof and the leading portion of the baffle 68. The resilient member 74 also serves to normally urge the baffle 68 to an upstanding position.

The rear baffle 70 is normally urged to an upstanding position by means of a resilient member 76 engaging the underside of the trailing portion thereof, the resilient member being illustrated as a compression spring.

The underside of the trailing portion of the intermediate baffle 68 and the leading part of the baffle 70 are interconnected by a further resilient member 77, preferably in the form of a compression spring. It is also particularly pointed out here that the ramp 54 has a fixed trailing flange 78 under which the leading edge of the forward baffle 56 will engage when it's in its horizontal position. Further, the trailing portion of the baffle 56 will overlie the leading portion of the baffle 68. In a like manner, the trailing portion of the intermediate baffle 68 overlies the leading portion of the rear baffle 70.

With particular reference to FIG. 3, it will be seen that the baffles are in a normal position with the baffles 56 and 70 up and the baffle 68 down. A wave 80 entering into the trough 48 will force water onto the baffle 56 and due to the offcenter mounting thereof, the baffle 56 will swing to its horizontal position, effecting a pumping stroke with the pump 61.

Referring now to FIG. 4, it will be seen that the wave 80 has passed over the baffle 56 and urged the same to its horizontal position. The movement of the baffle 56 to its horizontal position results in the resilient member 74 urging the leading edge of the baffle 68 down to the position where the baffle 68 is in its up position.

It will be readily apparent that as the wave 80 passes over the baffle 56 and engages the baffle 68, the weight of the water of the wave 80 will force the baffle 68 down to its down position effecting a pumping stroke of the associated pump 71.

When the baffle 68 moves to its down position, the upward movement of the leading edge thereof, through the resilient member 74 will return the baffle 56 to its up position. In a like manner, the downward movement of the trailing edge of the baffle 68 to its down position, through the resilient member 77 acting on the leading edge of the baffle 70 will urge the baffle 70 to its up position. When the wave 80 passes from the baffle 68 to the baffle 70, the baffle 70 will then move to its down position to effect a pumping stroke of its associated pump 72. After the wave has passed beyond the baffle 70, it will be returned to its up position by the resilient member 76. The pumping unit 44 is now ready to receive another wave.

At this time it is pointed out that if there are additional intermediate baffles 68, the operation thereof will be the same as that described with respect to the baffle 68 except that the adjacent baffles 68 will react with one another with the forward one of the intermediate baffles 68 acting in the manner of the forward baffle 56 and the rearward one of the intermediate baffle 68 acting in the manner of the rear baffle 70.

It will be readily apparent that inasmuch as the rear wall 55 of the trough 48 extends upwardly to the effective level of the baffles, which effective level of the baffles is generally the mean water level, the outflow of the waves will have no effect whatsoever on the baffles and the capability thereof to coact with a following wave or waves.

In the illustrated form of the invention of FIG. 5, the pumps 61 are fixedly secured to the bottom of the trough 48 and the connection 64 of each baffle with respect to its associated pump rod 63 permits the necessary relative movement between the pump rod and the baffle. However, the sliding connection 64 of FIG. 5 may be eliminated in the manner shown in FIG. 7.

With reference to the baffle 56 and the pump 61, it will be seen that the pump 61 may be mounted with respect to the trough bottom 50 by means of a pivotal connection 81 which permits the pump 61 to pivot at its bottom about a transverse axis. This permits the upper end of the pump rod or piston rod 63 to be directly pivotally connected to the baffle 58 by means of a conventional transverse pivotal connection 82.

The pivotal mounting of the pump 61 requires flexible connection with the associated pipes. The lower part of the pump 61 is connected to the pipe 65 by a pivotal connection 82 while the upper part of the pump 61 is connected to the pipe 67 by a flexible connection 84.

It is also pointed out at this time that it is possible to repair individual ones of the baffles and the associated pump by merely disconnecting the baffle from its prior baffle and locking the same in a horizontal position. When the baffle is locked in a horizontal position, and the associated resilient member removed therefrom, the adjacent baffle or baffles may continue to function in the normal manner.

Figure 8:
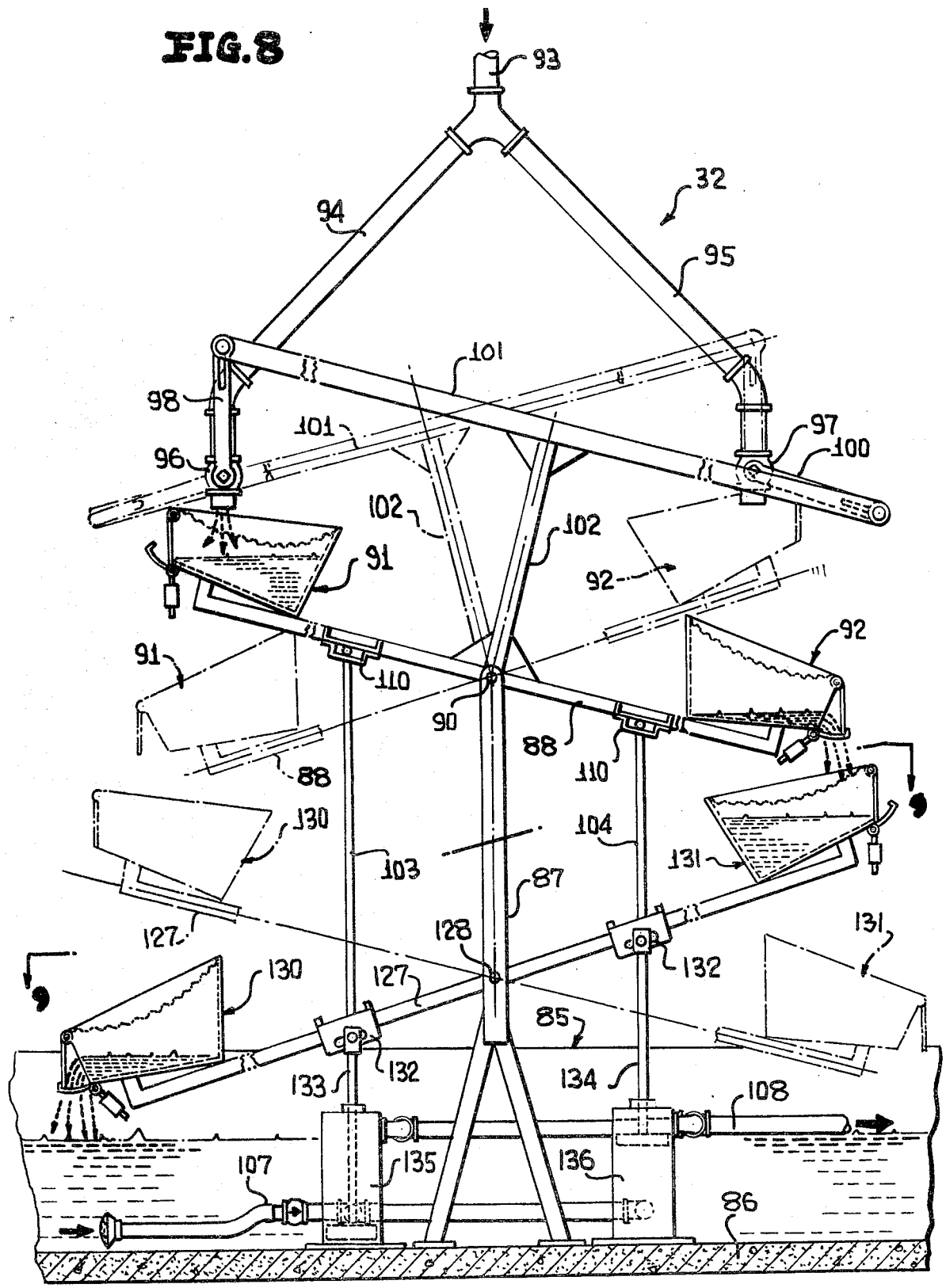
FIG. 8 is an enlarged elevational view of a gravity actuated bucket type pumping system in accordance with this invention.
Figure 9:
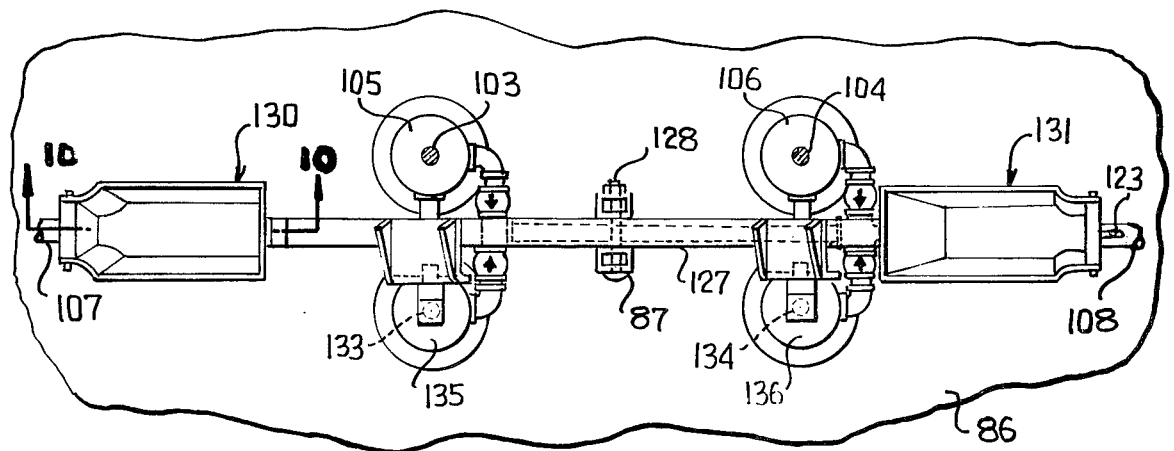
FIG. 9 is a generally horizontal sectional view taken along the line 9—9 of FIG. 8 and shows further details of the system.
Figure 10:
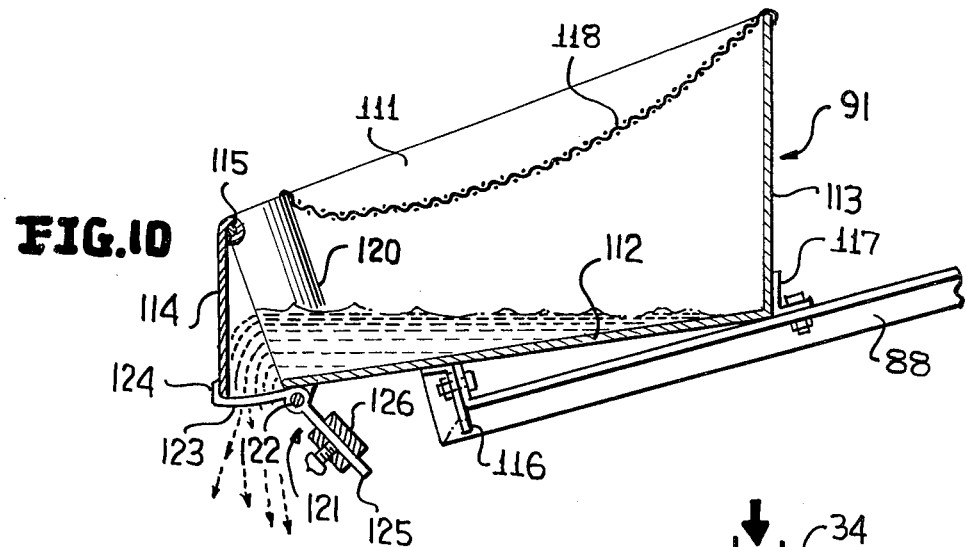
FIG. 10 is an enlarged fragmentary vertical sectional view taken along the line 10—10 of FIG. 9 and shows further the constructional details of one of the buckets of the pumping system.

Reference is now made to FIGS. 8-10 and the pumping system 32 more specifically illustrated therein. It is to be noted that first of all the pumping system 32 includes a shallow holding tank 85 having a base 86. Extending upwardly from the base 86 is an upstanding support 87. A walking beam 88 is mounted at the upper end of the support 87 by means of a horizontal pivot 90. The walking beam has rigidly mounted on opposite ends thereof buckets 91 and 92 for movement therewith. It is to be understood that when a bucket reaches a lowermost position, it discharges the water contained therein and when the bucket is in its uppermost position, it is filled with water.

Water is delivered to the buckets 91,92 through a central supply pipe 93 which is split into separate conduits 94 and 95 serving the bucket 91 and 92, respectively. At the lower end of the supply conduit 94 is a valve 96 for controlling the flow of water from the supply conduit 94. A similar valve 97 is at the lower end of the supply conduit 95.

The valve 96 is provided with an actuating arm 98 and the valve 97 has a like actuating arm 100. The arms 98, 100 are interconnected by a bar 101 which is pivotally connected to each of the arms. The bar 101 is disposed above and parallel to the walking beam 88 and is rigidly connected to the walking beam 88 by a strut 102.

It will be readily apparent from FIG. 8 that when the bucket 91 is in its uppermost position, the bar 101 has moved the arm 98 to a position wherein the valve 96 is opened. On the other hand, the bar 101 has moved the arm 100 to a position where the valve 97 is closed. While the bucket 91 is being filled, the bucket 92 is being emptied and once an over equilibrium occurs, the bucket 91 will move down and the bucket 92 will move up with the result that the bucket 91 will then discharge its contents and the valve 97 will be opened to fill the bucket 92. It is to be understood that the valves 96 and 97 and the buckets 91 and 92 are so constructed wherein the buckets will be rapidly filled and at the same time will rapidly discharge their respective contents in the required orderly fashion.

The walking beam 88 has connected to opposite sides of its central pivot 90 pump rods 103 and 104 of a pair of pumps 105 and 106, respectively, seated on the base 86. A suitable intake line 107 and an exhaust line 108 are connected to the pumps for supplying water thereto from the holding tank 85 and delivering water to the conduit 33 for flow up into the holding tank 21.

It is to be understood that the connections between the pump rods 103 and 104 and the walking beam 88 will be of the type permitting relative pivoting movement between the walking beam 88 and the pump rods while also permitting the relative lateral movement between the walking beam and the pump rods. Such connections are generally designed by the numeral 110.

Reference is now made to FIG. 10 wherein the details of a typical bucket, the bucket 91, are illustrated. It will be seen that the bucket 91 is trapezoidal in side elevation and includes a pair of trapezoidal shaped side walls 111 which extend upwardly from a bottom wall 112. The bucket 91 also includes a fixed end wall 113 and a pivotally mounted end wall 114 which functions as a discharge gate. The end wall 114 is pivotally mounted at its upper end on a pivot 115 extending between the side walls 111. The bucket 91 is secured to the walking beam 88 by means of suitable brackets 116 and 117.

In order to restrict splashing due to the rapid delivery of water to the bucket 91, the upper portion of the bucket 91 is provided with a splash guard in the form of a screen 118. Also, in order to facilitate the controlled discharge of water from the bucket 91, it is to be noted that the side walls 111, while they extend parallel to each other from the end wall 113, adjacent the end wall 114, are bent inwardly towards each other as at 120 so as to define a narrow discharge opening. It is to be understood that the discharge gate 114 is much narrower than the end wall 113.

As is clearly illustrated in FIG. 10, when the bucket 91 is in its lowermost position, the bottom 112 slopes downwardly and outwardly to the left so as to empty all the water therefrom. In a like manner, the gate 114 has a tendency to swing to an open position. On the other hand, when the bucket is in its uppermost position (FIG. 8), the bottom wall 112 slopes downwardly and inwardly to the right with there being an automatic tendency of the gate 114 to assume a closed position under gravity. In order to facilitate the retention of the gate 114 in sealed relation with respect to the side walls 111 and the bottom wall 112 when the gate is in its closed position and also to limit the opening movement of the gate, there is provided a control device, generally identified by the numeral 121. The control device 121 includes a horizontal pivot shaft 122 carried by the underside of the bottom wall 112 and mounted thereon is one or more arms 123 which are longitudinally curved and which terminate in an upstanding finger 124. Counterbalancing the arm or arms 123 is a counterbalance arm 125 carrying an adjustably positioned counterweight 126.

As clearly shown in FIG. 10, the finger or fingers 124 serve to limit the opening of the gate 114. As is shown in FIG. 8 with respect to the bucket 91, the curved arm 123 engages the bottom edge of the gate 114 when it is in its closed position to retain it in compressive engagement with the ends of the side walls 111 of the bottom wall 112.

Preferably, the pump system 32 includes at least one additional walking beam 127 which is also pivotally mounted on the support 87 by a horizontal pivot 128. Carried at the outer ends of the walking beam 127 are buckets 130 and 131 which generally underlie the buckets 91 and 92, respectively. The walking beam 127 is provided with couplings 132 which connect the same to upper ends of pump rods 133 and 134 of pumps 135 and 136, respectively. The pumps 135 and 136, like the pumps 105 and 106 are suitably connected to the intake pipe 107 and the discharge pipe 108.

It is to be understood that when the bucket 92 is in its lowermost position, the associated bucket 131 is in its uppermost position so that the water discharged from the bucket 92 will discharge into the bucket 131. At the same time, the bucket 130 is discharging its supply of water and the the bucket 91 is receiving its supply of water. The bucket 131 becomes filled at the same time as does the bucket 91 so that when the walking beam 88 rotates in a counterclockwise direction, the walking beam 127 rotates in a clockwise direction with the result that when the bucket 91 reaches its lowermost position and begins to discharge the water therein, the bucket 131 is in its elevated position ready to receive the water. This is clearly shown in phantom lines.

At this time it is pointed out that it is also feasible to supply additional walking beams 127 and additional sets of buckets together with additional pumps.

Figure 11:
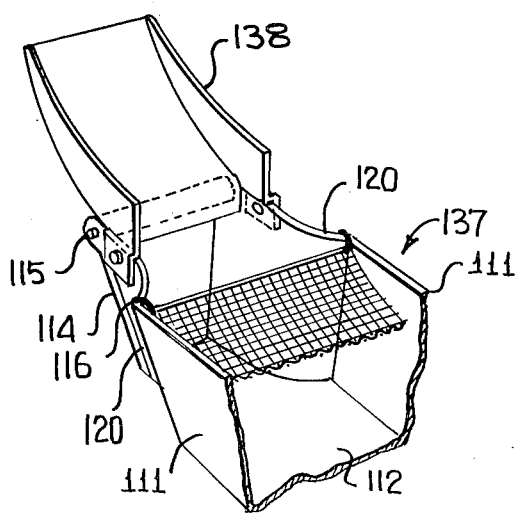
FIG. 11 is a fragmentary perspective view of a modified form of bucket.

Reference is now made to FIG. 11 wherein there is illustrated a modified form of bucket which is generally identified by the numeral 137. The bucket 137 is of identical construction with the previously disclosed buckets 91, 92, 130 and 131. However, it is provided with an extension 138 in the form of a deflector at that end thereof carrying the movable end wall or gate 114. As is shown in FIG. 8, the walking beam 127 is longer than the walking beam 88 so that the buckets 130 and 131 may be positioned outwardly of the buckets 91 and 92, respectively, to receive the discharge therefrom. However, in order that the walking beam 127 may be a duplicate of the walking beam 88 and the bucket 130 directly underlying the bucket 91 while the bucket 131 directly underlies the bucket 92, it is necessary that the buckets 130 and 131 be constructed with the extension or deflector 138. Thus, the water discharged from the overlying bucket will pour onto the deflector 138 and down into the interior of the bucket.

It is to be understood that the water finally discharged from the buckets will enter into the holding tank and will form the water supply for the various pumps. While all of the water discharged by the pumps cannot be pumped upwardly by the pumps, it is to be understood that the holding tank 85 will maintain the water therein at the required level to supply these pumps.

At this time it is pointed out that all of the pumps have been illustrated as being directly connected to their actuators. When it is desired to pump the water to very high levels, the permissible sizes of the pumps may become so small as not to be feasible from a constructional standpoint. Accordingly, it is envisioned in accordance with this invention, but not specifically illustrated herein, that a reduction gearing could be provided between the actuators and the respective pumps so as to convert a relatively long stroke of the actuator into a short stroke for the pump and thereby provide the necessary mechanical advantage for pumping at very high pressures.

It is also emphasized here that while the pump system 32 has been illustrated only as receiving the discharge from the generator 23, a similar pumping system could be incorporated in a stream for pumping a portion of the stream up into a holding tank, such as the holding tank 21. This is particularly true when the water in the stream has an insufficient head for operating a generator, but has sufficient flow to effect the necessary pumping of the water to an elevated holding tank. It is further pointed out here at this time that the utilization of the pump systems 28 and 32 is not restricted to one of supplying water for an electric generating system. It will be readily apparent that such a pump arrangement could be utilized in pumping water from a low level to an elevated level for the purpose of providing pressure within a water supply system at a constant high level.

Although only several preferred embodiments of the invention have been specifically illustrated and described herein, it is to be understood that minor variations may be made in the generating system and the pump system without departing from the spirit and scope of the invention, as defined by the appended claims.

I claim as new:

1. An electric power generating system for use in combination with a source of water power, said system comprising an elevated water storage means, water powered electric power generator means coupled to said storage means for receiving water under pressure therefrom, and water powered pump means adapted to be connected to the source of water power for pumping at least a portion of the requirements of said generator to said water storage means; said water powered pump means being of the wave motor type and including a plurality of separate pumps, a plurality of beam type baffles disposed end to end adjacent one another in trough means for defining the path of movement of waves wherein a trailing end portion of one of said baffles overlaps the leading end portion of an adjacent one of said baffles, each of said plurality of baffles connected to one of said separate pumps and movable through a pumping stroke from an upright position to a generally horizontal position at least in part by the weight of water of a wave of water passing thereover, and means for interconnecting a trailing end portion of a first of two adjacent baffles to a leading end portion of a second of said two adjacent baffles for moving one another in opposite directions wherein adjacent baffles move each other through return pumping strokes.

2. The system of claim 1 wherein said trough includes an inlet and an exit and means at said exit for preventing the return flow of waves through said trough.

3. The system of claim 2 wherein said inlet is a wide tapering arrangement for concentrating waves in said trough.

4. The system of claim 1 wherein said interconnecting means are resilient connecting means extending between a trailing end portion and said leading end portion of adjacent baffles for moving said baffles in opposite directions to simultaneously perform a pumping stroke with a first of said pumps and a return stroke with a second of said pumps.

5. The system of claim 4 wherein each of said baffles includes a pivot dividing the respective baffle into a short leading portion and a longer trailing portion, and counterbalance means carried by said short portion.

6. Water powered pump system of the wave motor type comprising a plurality of separate pumps, a plurality of beam type baffles and trough means for defining the path of movement of waves, said baffles disposed end to end adjacent one another in said trough means wherein a trailing end portion of one of said baffles overlaps the leading end portion of an adjacent one of said baffles, each of said plurality of baffles connected to one of said separate pumps and movable through a pumping stroke from an upright position to a generally horizontal position at least in part by the weight of water of a wave of water passing thereover, means for interconnecting a trailing end portion of a first of two adjacent baffles to a leading end portion of a second of said two adjacent baffles for moving one another in opposite directions wherein adjacent baffles move each other through return pumping strokes.

7. The system of claim 6 wherein said trough includes an inlet and an exit and means at said exit for preventing the return flow of waves through said trough.

8. The system of claim 7 wherein said inlet is a wide tapering arrangement for concentrating waves in said trough.

9. The system of claim 8 wherein said interconnecting means are resilient connecting means extending between a trailing end portion and said leading end portion of adjacent baffles for moving said baffles in opposite directions to simultaneously perform a pumping stroke with a first of said pumps and a return stroke with a second of said pumps.

10. The system of claim 9 wherein each of said baffles includes a pivot dividing the respective baffle into a short leading portion and a longer trailing portion, and counterbalance means carried by said short portion.

* * * * *